May 12, 1959  D. FIRTH  2,886,356
LOCKING SPLIT SPRING COLLAR ARRANGEMENTS
Filed Dec. 9, 1955  2 Sheets-Sheet 1
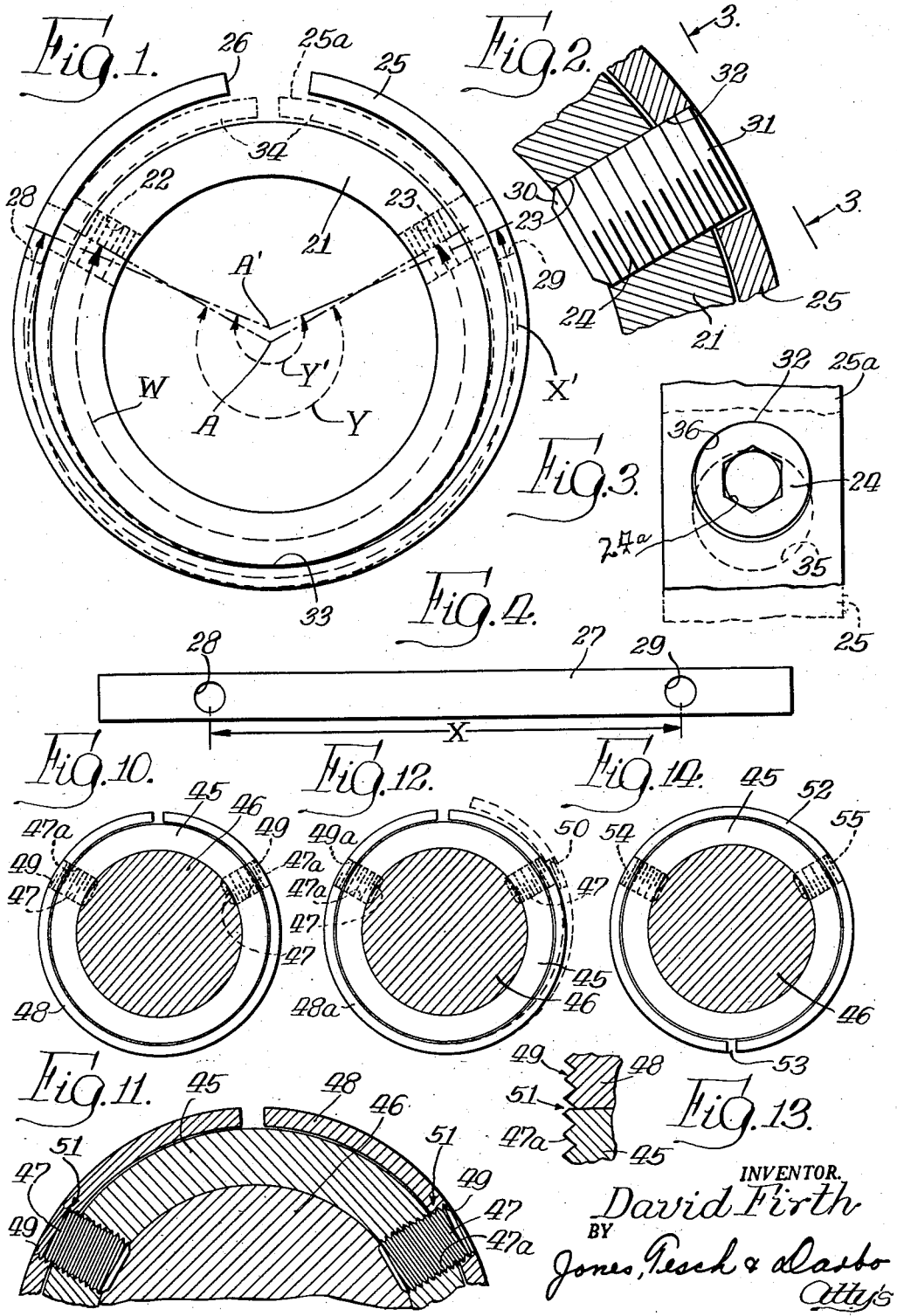
INVENTOR.
David Firth
BY
Jones, Pesch & Darbo
Attys

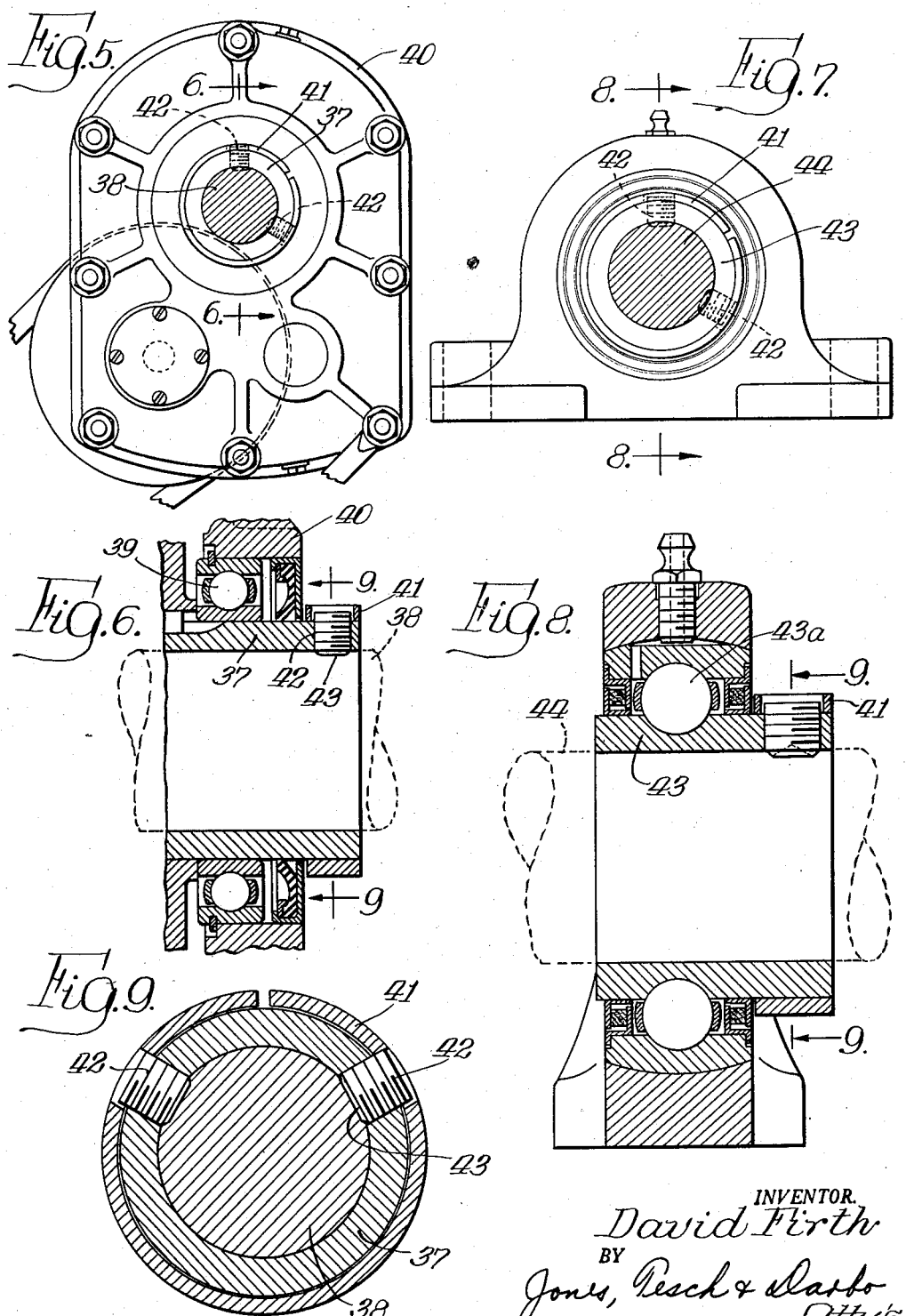

United States Patent Office 2,886,356
Patented May 12, 1959

2,886,356

LOCKING SPLIT SPRING COLLAR ARRANGEMENTS

David Firth, South Bend, Ind., assignor to Dodge Manufacturing Corporation, Mishawaka, Ind., a corporation of Indiana Application December 9, 1955, Serial No. 552,173

7 Claims. (Cl. 287—52.08)

This invention relates to locking split spring collar arrangements for use with other cylindrical members in machinery and transmission appliances.

A locking collar has generally been a metal annulus formed to fit snugly on another cylindrical member and being drilled and tapped through its radial thickness to provide one or more threaded screw holes for threaded engagement by a set screw or screws for fastening the collar to the cylindrical member or the cylindrical member to shaft. Such a locking collar may be fitted on an interposed sleeve as in the case of a clamping collar for fastening such sleeve to the shaft and it is to the latter species that the present invention is more particularly directed. Heretofore, set-screws, in threaded engagement with the collar, have passed loosely through unthreaded or so-called clear holes in the sleeve.

Collars of this class are commonly made from solid steel shafting by boring, and cutting the bored shafting into sections, the work being usually done in an automatic screw machine and in some instances on turret lathes, making the cost of manufacture generally undesirably high, due in part to the expense of machining operations and in part to the wastage of the large amount of metal that is bored out from the preliminary shafting.

Also, in the use of clamping collars, the set-screws by which they are fastened are liable to work loose unless locked. Devices such as lock-nuts or locking washers not only add to the expense but also necessitate use of longer set screws than would otherwise be required, whereas it is desirable to utilize short screws both for the lower cost thereof and to avoid objectionable protuberance of the screws from the periphery of the collar, such protuberances creating objectionable hazards.

In my pending application Serial No. 212,354, filed February 23, 1951, now Patent No. 2,739,830, granted March 27, 1956, entitled "Shaft Collars," I disclosed and claimed a two-part collar for use as either a shaft collar or a clamping collar and comprising an outer ring and a split inner ring, the outer ring being a solid ring, i.e., continuously cylindrical. In that disclosure the solid ring was not avoided.

An important object of the present invention is the provision of a practicable and efficient self-locking split spring collar arrangement of a novel construction and mode of application, and susceptible of manufacture at relatively low costs, while at the same time locking the screws without the need for extraneous expedients.

The present invention eliminates the need of any solid ring as a locking collar and discloses a novel arrangement whereby a split ring may be used to perform the double function not only of a retaining collar but also of such a collar having self-locking functions, thus further minimizing manufacturing and assembly costs and providing a greatly simplified arrangement.

The invention includes both expedients and process.

The aforestated and other objects and advantages will be apparent from the following description, and the invention will be understood, by reference to the accompanying drawings, showing illustrative embodiments of the invention and exemplary applications thereof, and in which drawings—

Figure 1 is an end view showing a cylindrical member with my improved locking collar in initial posiltion thereon, in full lines, and in dotted lines showing the locking position of the collar before the screws are inserted;

Figure 2 is an enlarged cross-sectional segmental view of the arrangement shown in Fig. 1, depicting the screw in elevation after the latter is applied both to the locking collar and to the cylindrical member;

Figure 3 is a somewhat diagrammatic peripheral segmental view illustrating the different positions of the hole in the collar, before securement, in dotted lines, and after securement, in full lines.

Figure 4 is a plan view of a rolled steel strip from which the collar may be formed, showing holes therein for the set screws.

Figure 5 is a view of an illustrative speed-reduction mechanism to which the present invention may be adapted;

Figure 6 is an enlarged partial axial section on the line 6—6 of Fig. 5;

Figure 7 shows an illustrative anti-friction shaft-bearing or pillow block device to which the invention may alternatively be applied;

Figure 8 is an enlarged axial section taken on the line 8—8 of Fig. 7;

Figure 9 is a cross-section taken on the line 9—9 of Fig. 8 and being also an enlarged cross-section taken on the line 9—9 of Fig. 6;

Figure 10 is an end view somewhat similar to Fig. 1 showing a modified arrangement;

Figure 11 is a fragmentary cross-sectional view on a larger scale of the arrangement of Fig. 10;

Figure 12 is another view, somewhat similar to Fig. 10 of a further modification, showing a preliminary position of the collar in dotted lines;

Figure 13 is a fragmentary enlarged view showing the mismatched threads of the collar and cylindrical member; and Figure 14 is a view similar to Figs. 10 and 12 showing a still further modification.

Referring in detail to the illustrative constructions shown in the drawings, and turning first to Figs. 1 to 4 inclusive, the numeral 21 indicates a cylindrical member with which the present invention is advantageously associated. The member 21 exemplifies a solid cylindrical annulus or sleeve which for example may be adapted to have a snug fit on a power transmission shaft or the like. As is well known in the art, such a cylindrical sleeve 21 has been customarily secured to the shaft with which it rotates by a clamping collar about the cylindrical member with set-screws passing through and engaging both the clamping collar and the cylindrical member and also engaging the shaft itself, as shown for example in patents to Firth No. 2,543,905 of March 6, 1951, and Bodle No. 2,655,818 of October 20, 1953. In those prior arrangements the drilled holes in the clamping collar have been tapped for the set-screws and the latter have passed through drilled clear holes in the cylindrical member, to impinge upon the shaft. Clear holes, in the sense of this specification, are threadless holes through which the screws pass, the clear holes being just slightly larger than the screw diameter so as to afford free passage for the screws.

In accordance with the present invention, the cylindrical member 21 is drilled and tapped, in the present instance in two places 22 and 23, for threaded reception of the set-screws 24 (Fig. 2). To take the place of a solid clamping collar around the member 21, I here provide a split spring locking collar 25 having a pronounced gap 26 therein. The spring collar 25 is made of an oversize or noticeably larger inner diameter than the outer diameter of the cylindrical member 21, this diameter being of a circle defined by the collar 25 including the gap 26.

The cylindrical member 21 defines a circle having the center A and the screw holes 22 and 23 are drilled a distance apart, center to center, intercepting the angle Y which in this instance is an angle of 240° and intercepting the arc W which may be thought of not only as an arc of 240° but also as having a given linear value, if developed on a flat surface, here referred to as the circumferential length of the arc W. As shown in the drawings the arc W represents a median between the arcs, measured from the centers of the holes 22 and 23, on the inner and outer perimeters of the cylindrical member 21. The median arc is taken as a matter of convenience for facility of illustration on the drawing and for the reason that it is approximately the same circumferential length as the arc intercepted by angle Y on the outer surface of the cylindrical member 21.

As suggested by Fig. 4, the split spring collar 25 may be formed from an initially flat strip made of rolled steel 27 and then formed to a partial annulus of the said predetermined oversize diameter, as shown in full lines in Fig. 1.

Either while the strip 27 is still in the flat or after it is formed to collar shape, holes 28 and 29 are drilled therein for the set-screws 24, these holes, in the examples of Figs. 1 to 4, being clear holes. The holes 28 and 29 are placed apart, center to center, a predetermined distance indicated as X in the flat strip (Fig. 4), this distance becoming the arc X', in degrees of the circle described by the collar 25 (Fig. 1).

Similarly to the arc W, the arc X' is a median of the inner and outer circumferential lengths of arcs intercepted by the angle Y' on the circle having the center A' about which the collar 25 is scribed.

Following the present invention, the circumferential length of the arc X', which is also the linear length X, is made substantially the same as the circumferential length of the arc W, but since an equivalent circumferential length on a larger circle will be intercepted by a smaller angle than on the smaller circle, the holes 28 and 29 in the locking collar 25 will not initially register or be aligned with the screw holes 22 and 23 in the cylindrical member 21. To put this another way, the equivalent circumferential length, laid out on a larger circle, will define a smaller arc, measured in degrees of a circle, than the same circumferential length on a smaller circle. Hence since the arcs X' and W, are of the same circumferential length, the angle Y' is substantially smaller than the angle Y and substantially less than 240°.

By way of example, if the outer circumference of the cylindrical member 21 is, say, two inches, the perimeter of the member 21 in that case would have (pi × diameter) a circumferential length of 6.2832 inches. If the screw holes 22 and 23 are drilled at a distance apart of 120° (being the reflex angle of the 240° angle), the circumferential length of an arc intercepted by said 240° angle on the perimeter of the member 21 would be two-thirds of 6.2832 or 4.1888 inches. If now the inside diameter of the locking collar 25 (as in full lines in Fig. 1 and including the gap 26) be made 2 1/16 inches, or 1/16 inch larger than the outside diameter of the cylindrical member 21, and the circumferential distance apart, center to center, of the holes 28 and 29 in the locking collar 25, on the inner circumference of the collar, be made 4.1888 inches, then the latter circumferential length would define a smaller arc on the inside circumference of the locking ring than on the outside circumference of the member 21. To cause the holes 28 and 29 to register with the holes 22 and 23, respectively, on a circle for the ring 25 of 2 1/16 inches diameter, they would have to be circumferential distance apart of 4.3196 inches, or a circumferential difference (4.3196 minus 4.1888) of .1319 inch, which represents the amount by which the holes 28 and 29 are out of alignment with the holes 22 and 23, as they are actually drilled, this mismatching or circumferential differential being advantageously availed of for the purposes of the present invention.

Instead of drilling the holes 28 and 29 in the flat strip 27 a distance apart of 4.1888 inches, which would be one way of arriving at the beneficial result of a following of the invention, preferably the collar 25 is collapsed on a jig so that its inside diameter is approximately two inches, or about the same as the outside diameter of the member 21. Thereupon the holes 28 and 29 are drilled in the member 25 while the collar is so collapsed, in register, i.e. aligned with the holes 22 and 23 respectively. It will be understood that the collar 25, being of resilient metal, will, upon release from the jib, spring back to its original or normal shape having an inner diameter of 2 1/16 inches.

When now the collar 25 is assembled with the cylindrical member 21, the collar is again collapsed to register the holes 28 and 29 with the holes 22 and 23 respectively and the set screws 24 are placed therein, the screws being long enough, so that, as best seen in Fig. 2, they extend entirely through the holes in the cylindrical member, projecting slightly therebeyond inwardly as indicated at 30 (Fig. 2), to contact the shaft or the like and having their outer end 31 in the locking collar 25 but desirably not projecting therefrom. With the screws so disposed, the locking collar 25 will assume the position shown in dotted lines as at 25a (Fig. 1), but with the tendency of the collar to spring back to the position shown in full lines. This tension in the collar causes the screws to bind as at 32 in the holes in the collar, by bending moment on the screws 24 or by enhancing friction between the screw and the wall of the collar hole, this friction in turn preventing or inhibiting accidental unloosening of the screws and thereby automatically locking them.

It will be observed that the screws desirably bind at 32 at the sides of the holes nearest the gap 26, and for that reason, the holes 28 and 29 could be elongated in a direction away from the gap while still functioning as described to lock the screws.

Since the collar 25 when assembled with the cylindrical member 21 has a loose fit thereon, in the process of assembly after locating of the screws in the cylindrical member 21, the collar will tend to become slightly eccentric with respect to the cylindrical member so as to be tangent therewith as at 33 approximately mid-way of the 240 degree angle while being noticeably spaced therefrom in the region of the gap in the collar. Even when the collar is again collapsed and the screws entered in the aligned holes of both the collar 25 and the cylindrical member 21, due to the practicalities of the situation and the resilience of the collar, the latter may be slightly spaced from the cylindrical member in the vicinity of the gap as at 34.

Fig. 3 is illustrative of the appreciable distance by which the collar must be pulled together or collapsed to cause the screw holes to register sufficiently to locate the screws therein in both the collar and the cylindrical member, an uncollapsed position of the screw hole in the collar being indicated at 35 and the collapsed position at 36.

The collar 25 is of such material and thickness that it possesses a high required degree of stiffness while being sufficiently flexible to be distorted or collapsed from the position shown in full lines of Figure 1 to the position shown in dotted lines or even to a somewhat greater extent, without exceeding the elastic limit of the material so as to have the required resilience or spring action described. If desired, the collar 25 may be heat treated for greater resilience and thereby to give greater spring tension. It will be understood by those skilled in the art, that any suitable relative dimensions for the spring collar and the cylindrical member may be employed to produce the results herein described.

Figs. 5 and 6 illustrate the application of the present invention to a power transmission unit or speed reducer such as is shown in the Bodle patent hereinbefore mentioned, and Figs. 7 and 8 show its application to an anti-friction shaft bearing structure such as is shown in the said Firth patent.

As seen in Figs. 5 and 6 a cylindrical member such as previously referred to may here be exemplified by the sleeve 37 intended to be operatively integral rotatively with a shaft such as 38, the sleeve 37 constituting a rockable mounting, through the anti-friction bearing 39, for a gear reduction unit 40. Here the locking collar 41, constructed and assembled in accordance with the present invention, is placed around the sleeve 37, and, after collapsing the collar 41 so that its inside diameter is substantially the outside diameter of the sleeve 37, the set-screws 42 are located therein, both in the clear holes in the collar and in the tapped holes in the sleeve, the spring action of the collar 41 binding the screws and insuring that they will not come loose accidentally but will maintain their positions, impinging upon the shaft 38 as at 43, to prevent either rotative or longitudinal displacement of the sleeve 37 with respect to the shaft.

Similarly with respect to Figs. 7 and 8, a cylindrical member referred to as here represented by the ball race 43 for the ball bearings 43a is intended in use to be operatively rotatably integral with the shaft 44. Here again, the collar 41 serves a similar purpose as with respect to the previous figures of the drawings.

In the instances just cited, the split locking collar takes the place of the solid collar 9 of Patent No. 2,655,818 and the solid collar 11 of Patent No. 2,543,905 thus minimizing the cost of the structures and enhancing the securement of the set-screws.

In Fig. 10 I have shown a modification of the invention in which the cylindrical member 45 is fitted on the shaft 46 and is held thereto by the set-screws 47 received in threaded holes 47a in the cylindrical member and in this instance the split spring locking collar 48 also has threaded holes 49 therein, the set-screws 47 (Fig. 11) thus being threadedly received in both the tapped holes 47a of the cylindrical member 45 and also the tapped holes 49 of the collar 48, the collar 48 being otherwise constructed and assembled in the same way as the collar 25 of the first figures. The threads of the holes 49 are of the same pitch as that of the holes 47a but the holes 49 are tapped separately from the holes 47a.

Fig. 12 shows another modification in which the same cylindrical member 45 fitted on the shaft 46 has associated therewith a locking collar 48a, the latter in this instance having only one of its holes threaded as at 49a, the other hole 50 therein being a clear hole, the collar 48a being otherwise constructed and assembled as already described with reference to the spring collar 25. Here one of the set-screws 47 may be assembled first with the threaded hole 49a in the collar 48a and the threaded hole 47a in the member 45.

Fig. 13 (as well as Fig. 11) shows an exaggerated view of what happens to the threads of the holes 47a of the cylindrical member 45 with relation to the threads of the holes 49 of the locking collar 48 and the hole 49a of the locking collar 48a. Since the holes in the cylindrical member and the holes in the locking collar are tapped separately there will normally be some mismatching, as at 51, of the threads 47a and 49 (or 49a as the case may be), and this is advantageous to further bind the set screws in the holes against accidental unscrewing. This mismatching of the threads may be availed of to minimize the amount of oversize desirable in the locking collar.

Fig. 14 shows a still further modified arrangement in which the split collar 52 has its gap 53 on the opposite side of the collar diameter so that the screw holes 54 and 55 are closer together on the side of the collar opposite the gap. In this modification both holes of the split collar as well as the holes of the cylindrical member are tapped for the screws as indicated in Figs. 10 and 11.

The set screws are desirably of relatively large diameter with respect to the thickness of the locking collar to enhance the friction, and their outer ends include formations 24a (Fig. 3) adaptable to an applicator tool.

It will be understood that in each case, the gap or split in the spring locking collar is present both when the collar is in its uncollapsed state and also when it is in its collapsed state, and that the gap is sufficiently wide to permit the collapse of the locking collar for the purpose indicated without interference by undesired abutment of the free ends of the split collar at any time.

Illustrative embodiments of the invention having been disclosed, what is desired to be secured by Letters Patent is defined in the appended claims.

What is here claimed is:

1. A locking split spring collar arrangement comprising, in combination, a solid annular ring providing an unsplit sleeve member for a shaft or the like, a pair of circumferentially spaced apart threaded holes through said ring, screws therein respectively for engaging the shaft and having projections extending radially outwardly beyond the periphery of the ring, a resilient metal strip formed into an outwardly biased partial annulus having a substantial gap between its ends, said partial annulus fitting initially loosely around on said ring with its gap open and being resiliently collapsible toward the axis of the ring to more closely engage the ring, and a pair of openings through said partial annulus receiving said screw projections respectively when the partial annulus is collapsed, said openings being out of register with said projections when the partial annulus is uncollapsed, whereby the inherent resiliency of the partial annulus urges it away from said axis to its said uncollapsed condition and thereby places tension on said screws inhibiting loosening thereof in said threaded holes in the ring.

2. The arrangement of claim 1 wherein the partial annulus is of substantially less thickness than the ring.

3. The arrangement of claim 1 wherein the openings through the partial annulus are also threaded.

4. The arrangement of claim 3 wherein the threaded openings through the partial annulus are tapped separately from the threaded holes in the ring.

5. The arrangement of claim 1 wherein one of the openings through the partial annulus is threaded and the other is unthreaded.

6. The arrangement of claim 1 wherein the holes through the partial annulus are on opposite sides of a first diameter of the ring passing through said gap and on the same side of a second diameter normal to said first diameter, and are nearer said gap than the second diameter.

7. The arrangement of claim 1 wherein the gap is reduced but still open when the partial annulus is collapsed.

References Cited in the file of this patent
UNITED STATES PATENTS

| | | |
|---|---|---|
| 2,437,305 | Nickle | Mar. 9, 1948 |
| 2,739,830 | Firth | Mar. 27, 1956 |